Patented Feb. 16, 1943

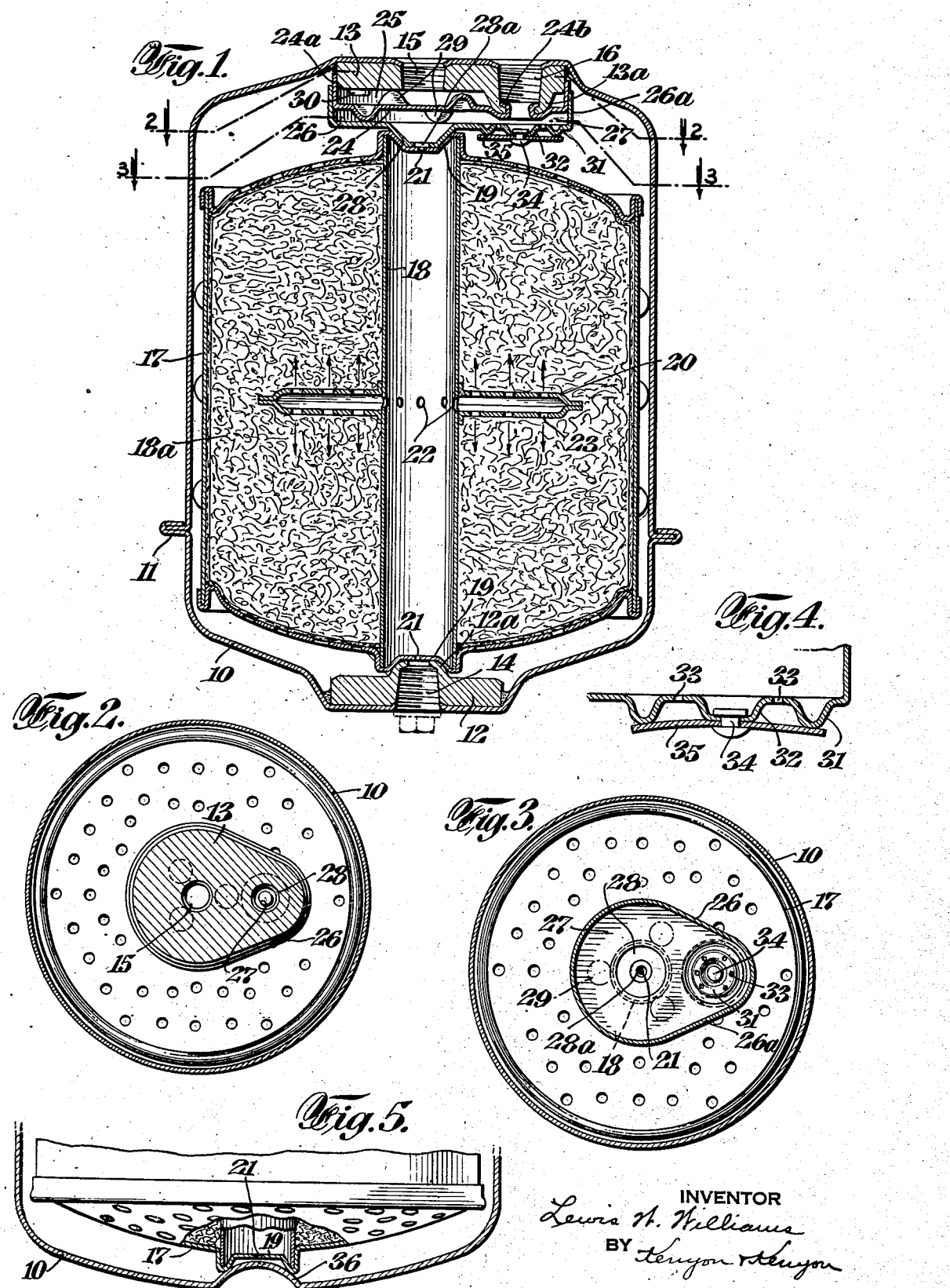

2,311,320

UNITED STATES PATENT OFFICE 2,311,320

FILTER

Lewis W. Williams, Short Hills, N. J., assignor to Purolator Products, Inc., a corporation of Delaware Application November 28, 1939, Serial No. 306,441

14 Claims. (Cl. 210—131)

This invention relates to filters and more particularly to the cartridge-type filter used in lubrication systems of internal combustion engines. This type of filter is characterized by a sealed container having threaded openings into which are screwed fittings for effecting attachment of the cartridge to the ends of two pipes through which dirty oil is supplied to and clean oil is discharged from the filter. Each engine manufacturer has its own arrangement of pipes and some arrangements require inlet and outlet openings at the same end of the cartridge while other arrangements require the inlet opening at one end and the outlet opening at the other end.

An object of this invention is a cartridge-type filter of such construction and arrangement that it may be easily connected up to either of the two above-described pipe arrangements.

Other objects, novel features and advantages of this invention will become apparent from the following specification and accompanying drawing, wherein:

Fig. 1 is a sectional view of a filter embodying the invention;

Fig. 2 is a section on the line 2—2 of Fig. 1;

Fig. 3 is a section on the line 3—3 of Fig. 1;

Fig. 4 is an enlarged fragmentary section, and

Fig. 5 illustrates a modification.

The cartridge housing or casing 10 consists of two cup-shaped parts having their rims interjoined at 11 to form a permanent seal. The ends of the casing are slightly offset and in one offset is arranged a reinforcing block 12 and in the other offset is arranged a reinforcing block 13. The block 12 is substantially circular and is provided with a central passageway consisting of a threaded bore 14 terminating in a projection 12a extending inwardly from the block 12. The block 13 is of elongated contour and has a port consisting of a threaded bore 15, the axis of which is in alignment with the axis of the bore 14. Also, the block 13 is provided with a passageway consisting of a threaded bore 16 terminating in a projection 13a extending inwardly from the face of the block, the bore 16 being offset from the bore 15. The casing 10 is provided with apertures registering with the bores 14, 15 and 16 to permit the flow of oil into and out of the housing. A filtering unit is arranged within the casing and comprises a cylindrical metal container 17 having an imperforate side wall and perforate end walls. A tube 18 extends lengthwise of the container and each end of the tube receives an inwardly offset portion 19 of each end wall of the container. The tube 18 is surrounded by a body of filtering material 18a and a distributor 20 carried by the tube 18 projects into said body of filtering material. In each offset end portion 19 is provided an orifice 21 through which oil may flow into the tube 18 and said tube is provided with one or more apertures 22 through which oil may flow from the tube into the distributor from which it may escape by way of holes 23 into the body of filtering material.

A flanged plate 24 has its flange 24a press-fitted on the block 13 to form a chamber 25 and has a depression receiving the projection 13a. The depression is provided with a collar 24b which extends into the projection 13a. A second flanged plate 26 has its flange 26a press-fitted on the flange 24a and the two plates cooperate to form a chamber 27 communicating with the bore or port 16. The plate 26 has an offset portion 28 fitting into the recess in the remaining end wall of the container 17 and also has an orifice 28a in register with the orifice 21. The plate 26 is composed of resilient metal and the arrangement is such that it provides sufficient resiliency to establish liquid tight seal between the ends of the container and the projection 12a and the offset portion 28. The plate 24 is provided with offsets 29 for engagement with the block 13 to maintain the plate in spaced relation thereto and for engagement by the plate 26 to prevent collapse of the plate 26 toward the plate 24. Aligned cutouts are provided in the flanges 24a and 26a to provide a port 30 establishing communication between the chamber 25 and the interior of the casing 10. The plate 26 has an annular offset 31, centrally of which is an offset 32, and in the space between the two offsets are provided holes 33. A rivet 34 passing through the offset 32 is attached to a resilient disk 35 which rests on the offset 31 in liquid tight relation thereto.

The bores 14 and 16 constitute inlet ports while the bore 15 constitutes an outlet port. When installed, the dirty oil pipe communicates with either the bore 14 or the bore 16 and the remaining bore is plugged and in all installations the clean oil pipe communicates with the bore 15. When dirty oil is supplied through the bore 14, it passes into the tube 18 by way of the orifice 21 and then flows through the distributor 20 into the body of filtering material. When dirty oil is supplied through the bore 16, it passes into the chamber 27 and from such chamber through the orifices 28a and 21 into the tube 18 from which it passes through the distributor into the body of filtering material. Filtered oil surrounds the element 17 and escapes from the interior of the casing 10 through the port 30 into the chamber 25 from which it flows out through the discharge port 15. In the event that the oil pressure in the chamber 27 exceeds a predetermined value, the disk 35 flexes to permit oil to flow from the chamber into the casing through the holes 33 (Fig. 4).

As shown in Fig. 5, the block 12 and the bored projection 12a may be omitted from the casing where it is desired to provide a filter having but a single inlet in the same end with the outlet. In this structure the casing is provided with an offset 36 which is adapted to cooperate with one end of the filter casing 17 in the same manner as described above in connection with the bored projection 12a. The projection 36 extends into the offset 19 of the container 17 in contacting relation thereto and the resiliency of the plate 26 maintains liquid-tight connection therebetween to prevent escape of oil through the aperture 21 in the offset 19. In this modification, the aperture 21 at the lower end of the tube 18 has no purpose in the operation of the completed filter, but is provided so that the container 17 may be inserted in the casing with either end contacting the projection 36, thereby simplifying assembly. Also, by having the two end plates of the container identical, the manufacturing cost of the container is minimized.

It is of course understood that various modifications may be made in the structure above described, without in any way departing from the spirit of the invention as defined in the appended claims.

I claim:

1. A filter comprising a casing provided at one end with a port communicating with the interior thereof and at opposite ends respectively with first and second passageways, one of which passageways is closed when the filter is installed in an internal combustion engine lubrication system, a container within said casing having a first passageway and a second passageway opposed thereto with said first container passageway in communication with said second casing passageway, said two last-named container and casing passageways terminating one in a recess and the other in a projection fitting into said recess, means for conducting oil between said first casing passageway and said second container passageway while preventing flow between said first casing passageway and said port, said means having walls provided with two passageways of which one communicates with said first casing passageway and the other communicates with said second container passageway, each wall passageway and its communicating passageway terminating one in a recess and the other in a projection fitting into said recess, filtering material within said container, and means establishing communication between the interior of said container and the interior of said casing.

2. A filter according to claim 1 provided with a tube in said container interconnecting the container passageways and a perforate distributor communicating with said tube and extending into said filtering material.

3. A filter comprising a casing provided at one end with a port and at the opposite ends respectively with first and second passageways of which one is closed when the filter is installed in an internal combustion engine lubrication system, a first plate attached to said casing in spaced relation to said port to provide communication between said port and the interior of said casing and having a passageway communicating with said first casing passageway, said two last-named plate and casing passageways terminating one in a recess and the other in a projection fitting into said recess, a second plate spaced from said first plate and having an apertured offset, a container within said casing having an apertured offset portion fitting said second plate offset and also having a passageway communicating with the second casing passageway, said two last-named container and casing passageways terminting one in a recess and the other in a projection fitting into said recess, a perpendicular flange on one of said plates contacting said other plate to form means for directing flow between said first casing passageway and said container while preventing flow between said first casing passageway and said port, filtering material within said container, and means for establishing communication between the interior of said container and the interior of said casing.

4. A filter according to claim 3 provided with a tube in said container interconnecting the container passageways and a perforate distributor communicating with said tube and extending into said filtering material.

5. A filter comprising a casing having at one end a first reinforcing block provided with a port and a second reinforcing block at its other end, each block having a bored projection one of which is closed when the filter is installed in an internal combustion engine lubrication system, a container within said casing having two opposed inwardly offset apertured portions of which one receives the second block bored projection, means for conducting oil between said first block bored projection and said container while preventing flow between said first block bored projection and said port, said means being spaced from said first reinforcing block to provide communication between said port and the interior of said casing and being provided with resilient walls having an apertured recess receiving said first block bored projection and an apertured offset received in the remaining container offset portion, filtering material within said container, and means establishing communication between the interior of said container and the interior of said casing.

6. A filter according to claim 5 provided with a tube in said container having its ends receiving said container offset portions and a perforate distributor communicating with said tube and extending into said filtering material.

7. A filter according to claim 5 in which said casing is composed of two interjoined cup-shaped portions each containing one of said reinforcing blocks.

8. A filter comprising a casing having at one end a first reinforcing block provided with a port and at its other end having a second reinforcing block, each block having a bored projection one of which is closed when the filter is installed in an internal combustion engine lubrication system, a metal container within said casing having two opposed inwardly offset apertured portions of which one receives the second block bored projection, a plate having an apertured recess receiving said first block bored projection and spaced from said first block to provide communication between said port and the interior of said casing, a second plate spaced from said first plate and having an apertured offset received in the remaining container offset portion, one of said plates having a perpendicular flange contacting the other plate to form means serving to direct flow between said first block bored projection and said container while preventing flow between said first block bored projection and said port, filtering material within said container, and means establishing communication between the interior of the container and the interior of said casing.

9. A filter according to claim 8 provided with a tube in said container having its ends receiving said container offset portions and a perforate distributor communicating with said tube and extending into said filtering material.

10. A filter according to claim 8 in which said casing is composed of two interjoined cup-shaped portions each containing one of said reinforcing blocks.

11. A filter comprising a casing provided at one end with a port and a passageway, a container within said casing having a passageway, means for conducting oil between said casing passageway and said container passageway while preventing flow between said casing passageway and said port, said means having walls provided with two passageways of which one communicates with said casing passageway and the other communicates with said container passageway, each wall passageway and its communicating passageway terminating one in a recess and the other in a projection fitting into said recess, filtering material within said container, and means establishing communication between the interior of said container and the interior of said casing.

12. A filter according to claim 11 provided with a perforate distributor within said container in communication with the container passageway.

13. A filter comprising a casing having a reinforcing block in which are two bores, a plate having a perpendicular flange fitting said block and forming therewith a first chamber communicating with one bore, said plate having an aperture in register with the remaining bore and an aperture communicating with the interior of said casing, a second plate spaced from said first plate and having a perpendicular flange fitting said first plate flange and forming with said first plate a chamber communicating with the second bore, said second plate having an apertured offset, a filtering unit in said casing having an apertured offset fitting said plate offset and means establishing communication between the interior of said container and the interior of said casing.

14. A filter comprising a casing having a reinforcing block in which are two bores, a plate having a perpendicular flange fitting said block and forming therewith a first chamber communicating with one bore, said plate having an aperture in register with the remaining bore and an aperture communicating with the interior of said casing, a second plate spaced from said first plate and having a perpendicular flange fitting said first plate flange and forming with said first plate a chamber communicating with the second bore, said second plate having an apertured offset, and a filtering unit in said casing having an apertured offset fitting said plate offset, means establishing communication between the interior of said container and the interior of said casing, said second plate having an annular offset and a plurality of holes within said offset, and a resilient disk fastened to said second plate in contact with said annular offset.

LEWIS W. WILLIAMS.